United States Patent
Manfredotti et al.

(10) Patent No.: US 8,636,121 B2
(45) Date of Patent: Jan. 28, 2014

(54) FILTER MECHANISM FOR FILTERING VIBRATION IN AIRCRAFT

(75) Inventors: Thomas Manfredotti, La Colle Sur Loup (FR); Paul Cranga, Marseilles (FR)

(73) Assignee: Eurocopter, Marignane Cedex (FR)

( * ) Notice: Subject to any disclaimer, the term of this patent is extended or adjusted under 35 U.S.C. 154(b) by 421 days.

(21) Appl. No.: 12/911,131

(22) Filed: Oct. 25, 2010

(65) Prior Publication Data

US 2011/0095132 A1    Apr. 28, 2011

(30) Foreign Application Priority Data

Oct. 28, 2009 (FR) ...................................... 09 05180

(51) Int. Cl.
*F16F 7/104* (2006.01)

(52) U.S. Cl.
USPC ...................... 188/379; 267/140.5; 244/122 R (58) Field of Classification Search
USPC ................. 248/592–593, 595, 608–609, 638; 188/378–380; 297/216.16, 216.19; 244/122 R, 118.1, 118.5, 129.1; 267/136, 131, 143, 154, 140.5
See application file for complete search history.

(56) References Cited

U.S. PATENT DOCUMENTS

| | | | |
|---|---|---|---|
| 3,536,165 A * | 10/1970 | Desjardins | ..................... 188/380 |
| 3,831,924 A * | 8/1974 | Skinner | ......................... 267/154 |
| 4,088,042 A | 5/1978 | Desjardins et al. | |
| 4,311,213 A | 1/1982 | Desjardins et al. | |
| 7,461,729 B2 * | 12/2008 | Manfredotti et al. | ......... 188/379 |
| 2007/0114104 A1 * | 5/2007 | Manfredotti et al. | ......... 188/379 |

FOREIGN PATENT DOCUMENTS

| | | |
|---|---|---|
| EP | 1719700 A2 | 11/2006 |
| FR | 2863966 A1 | 6/2005 |

OTHER PUBLICATIONS

Search Report and Written Opinion; Application No. FR 09 05180; dated Jun. 23, 2010.

* cited by examiner

*Primary Examiner* — Terrell McKinnon
*Assistant Examiner* — Ingrid M Weinhold
(74) *Attorney, Agent, or Firm* — Brooks Kushman P.C.

(57) ABSTRACT

The invention provides a vibration filter mechanism for aircraft equipment. A weighted lever arm (5) is hinged via bearings (22, 23) associated respectively with a first structure connected to a fuselage and with a second structure connected to the equipment (12). Deformable means (7) oppose pivoting movement of the lever arm. The lever arm (5) is arranged as a one-piece fork that comprises a pair of branches (19, 20) that are interconnected by a crossbar (21) and that are hinged to the bearings (22, 23) about spaced-apart parallel pivot axes (A1, A2). The fork carries a torsion shaft (24) that extends between the branches (19, 20) at their free ends (9), the torsion shaft (24) constituting the weight weighting the lever arm (5) and the deformable means (7) of the mechanism.

15 Claims, 3 Drawing Sheets fig. 1 fig. 2 fig.3 fig.4

FILTER MECHANISM FOR FILTERING VIBRATION IN AIRCRAFT

CROSS REFERENCE TO RELATED APPLICATION

This application claims the benefit of application no. FR 09 05180, filed Oct. 28, 2009, the disclosure of which is incorporated herein by reference.

FIELD OF THE INVENTION

The inventive mechanism relates to equipment for vehicles, in particular aircraft such as rotorcraft or the like. The mechanism protects on-board equipment from the vibration generated while the vehicle is advancing.

BACKGROUND OF THE INVENTION

In the transport field, it is known that a moving motor-driven vehicle is subjected to vibration. More particularly with aircraft, such as rotorcraft or analogous aircraft, the vibration generated by the moving vehicle is particularly severe and at high frequency. As an indication, the frequencies generated usually lie in the range about 10 hertz (Hz) to about 25 Hz, with motion at an amplitude that is small compared with overall movements caused by effects of the aircraft itself moving.

Such vibration is transmitted to equipment installed in the aircraft and it is harmful. For example, transmission of such vibration to seats installed in the cabin of the aircraft gives rise to discomfort for the passengers subjected thereto. Seats commonly incorporate suspension means that are designed to damp large amplitude movements that are generally caused by the effects of the aircraft moving, but such suspension means are not suitable for filtering the low-amplitude and high-frequency vibration. Also by way of example, other pieces of equipment in an aircraft may be sensitive to vibration and run the risk of malfunctioning and/or of needing to be protected from such vibration for safety reasons. Also for example, vibration transmitted to the equipment can give rise to noise nuisance. In general, it is useful, or indeed essential, to break any rigid connection between a main structure or fuselage of an aircraft and equipment on board the aircraft in order to avoid transmitting the vibration from one to the other.

In order to establish a frame of reference useful for understanding the prior art and the present invention, it is necessary to take the following directions and orientations into consideration, e.g. relative to the position at which a seat is installed in the cabin of the aircraft and the position of the passenger sitting on the seat. These directions and orientations can readily be transposed for any other piece of equipment, given the vibration to be filtered along the directions and orientations:

a transverse direction along a Y axis corresponds to an orientation about which the equipment is to be protected from pitching vibration. For a seat, for example, the direction extends between the passenger's right and left sides;

a longitudinal direction along an X axis corresponds to an orientation about which the equipment is to be protected from vibration in roll. For a seat for example, this direction extends from in front of to behind the passenger;

sliding corresponds to the equipment moving in the XY plane. This plane corresponds to the plane on which the equipment is supported in the aircraft; and a height-wise direction along a Z axis corresponds to an orientation in which the equipment needs to be protected from pumping vibration. This orientation extends orthogonally to the XY plane.

Solutions have been proposed that in general terms consist in interposing deformable means between the equipment and the fuselage of the aircraft. On the basis of their opposition to being deformed, use is made of the elasticity of the deformable means to absorb relative movements at high frequency and of low amplitude between the fuselage and the equipment. More particularly, the flexibility of the deformable means is used to filter such relative movements.

One known solution consists in interposing the deformable means between the equipment and a carrier structure secured to the fuselage, such that the elasticity of the means absorbs vibration on the basis of the deformation of the means caused directly by the relative movements between the structure and the equipment.

Document FR2863966 describes a seat provided with such resilient means. Such a solution presents the advantage of being inexpensive, compact, and easily integrated in a piece of equipment, in particular a seat. Nevertheless, relying exclusively on the resilience of the deformable means is not completely satisfactory in terms of the filtering that needs to be achieved in order to absorb nearly all of the vibration coming from the fuselage of the aircraft, particularly for any piece of equipment of a weight that is likely to vary, such as a seat that is likely to receive passengers having respective different weights.

Another known solution that is more complex consists in interposing between the equipment and the fuselage of the aircraft a mechanism that associates deformable means and a weighted lever arm. The lever arm allows relative movements to take place between the equipment and the fuselage, and the deformable means absorb the movements of the lever arm that generates force that is amplified by its weighting. Such a mechanism is consequently suitable for filtering the vibration to which the fuselage is subjected in order to avoid transmitting it to the equipment.

Document EP1719700 describes a device for supporting a rotorcraft battery. The spring stiffness is selected so that the resonant frequency of the suspension receiving the battery lies in the range about 20 Hz to about 30 Hz. One or more supports are secured to the rotorcraft so that the battery rests on the device interposed between the support and the battery. The height to the device is less than the height of the battery so as to limit overall size. The springs comprise a plurality of elastically deformable blades, and stiffness adjustment means modify the length of their active portions, using an abutment that is movable between a first position and a second position. Some of the spring blades deform in twisting under the effect of the weight of the battery and others deform in bending under the effect of the weight of the battery.

Document U.S. Pat. No. 4,311,213 describes a mechanism suitable for filtering the vibration to which a rotorcraft is subjected, and in particular the seat fitted thereto. That mechanism is organized as an array of link members, each interposed between the rotorcraft fuselage and a suspended seat-carrying platform. The link members are oriented substantially in crossed directions, and with hinge engagement on the fuselage, serving to carry the platform via resulting means in order to suspend it. Two link members are connected to each other by a torsion shaft or arm. Each link member comprises a deformable member that is interposed between the platform and the fuselage, and a lever arm for operating the deformable member carrying a weighting weight. The weight is carried by the lever arm at its free end opposite from its end anchored to the fuselage. The torsion shaft engages hinge bearings via which the lever arms of the corresponding link members are hinged to the fuselage at their anchor ends. Although that mechanism provides effective filtering, it is complex, expensive, bulky, and requires a specific arrangement and organization of the array of link members depending on the implantation. The arrangement of the array of link members and the ways in which they are interposed, need to be determined specifically.

Document U.S. Pat. No. 4,088,042 describes a vibration isolating system that is compact, of nodal type, filtering multiple frequencies and fitted to a helicopter. In FIG. 2, it can be seen that the system forms a four-branched cross, with four dampers at the ends of the branches.

SUMMARY OF THE INVENTION

One object of the invention is to propose a mechanism for filtering vibration applied to equipment on board a moving aircraft, in particular a rotorcraft in order to avoid transmitting the vibration. Such vibration is at a high frequency and is of low amplitude. Vibration is generated by the progress of the aircraft, and is transmitted to the equipment via the aircraft fuselage. The invention relates more specifically to a mechanism that takes account of the constraints, problems to be solved, and difficulties to be overcome as mentioned above.

The structure of the mechanism provides a compromise between compactness, simplicity of structure and of installation on board the aircraft, together with effectiveness with respect to the vibration for filtering, depending on the various orientations and movements mentioned above, in particular in pitching, in pumping, and in sliding, and possibly also in roll.

The vibration filter mechanism is designed for equipment on board an aircraft, in particular a helicopter. Such a mechanism is arranged to break the stiffness between the fuselage of the aircraft and the equipment that is to be protected from vibration, by interposing between them at least one member for filtering periodic forces of small amplitude and at high frequency to which the fuselage of the aircraft is subjected as it advances. The filter member is of the type that associates a weighted lever with deformable means that oppose transmission of the forces generated by the vibration towards the equipment.

The mechanism comprises at least one pair or a couple of similar filter members placed head to head.

The mechanism comprises at least one such filter member that is suitable for being interposed between a first structure connected to a fuselage of the aircraft and a second structure connected to the equipment that is to be protected from vibration. In one form, the filter member allows relative movement between the first structure and the equipment connected to the first structure.

Each lever arm is hinged via bearings associated respectively with the first structure and with the second structure. Vibration filtering is performed by establishing co-operation between the weighting weight of the lever arm that amplifies the forces to which it is subjected and the deformable means of elasticity that opposes transmission of the forces from the first structure to the second structure.

In general terms, the structure of the mechanism of the present invention comprises at least one filter member that is provided with interposition means for interposing between a first structure connected to a fuselage of the aircraft and a second structure connected to the equipment, in particular via fastener members that are dedicated thereto. The filter member comprises at least one lever arm:

that is weighted at a "free" one of its ends by an overall weight. The weighted lever arm is a member for amplifying forces coming from the first structure and going to the second structure;

that is hinged on bearings at its "anchor" other end opposite from its free end. These bearings are associated respectively one with the first structure and the other with the second structure, in particular being carried by the interposition means of the filter member between these structures. More specifically, the bearings are respectively carried by the fastener members comprised by the interposition means and associated respectively with the first structure and with the second structure; and that is associated with deformable means opposing pivoting movement of the lever arm on the bearings. The opposition provided by the deformable means serves to absorb the forces coming from the first structure, which forces are amplified and transmitted by the weighted lever arm. The forces transmitted to the deformable means have the effect of stressing the lever arm so as to oppose the transmission of the vibration between the first structure and the second structure, and specifically to absorb the vibration that would otherwise be transmitted from the fuselage of the aircraft to the equipment that is to be protected by means of the mechanism.

According to one embodiment of the invention, the lever arm is arranged as a one-piece fork that comprises a pair of branches that are connected together by a crossbar. The branches are individually hinged via the bearings respectively associated with one and the other of the structures about pivot axes that are spaced apart and parallel. The fork carries a torsion shaft that extends between the free ends of the branches.

The term "free end" is used of the branches and of the forks to designate the ends corresponding to the free end of the lever arm carrying the overall weighting weight, and the term "anchor" end of the branches and of the fork designates their opposite ends corresponding to the ends where the lever arms are anchored and mounted to pivot on the bearings associated respectively with the first structure and with the second structure.

More particularly, the filter member comprises the weighted lever arm, which is subdivided into two branches that are secured to each other by means of the crossbar or any other analogous member for connecting the branches together. Preferably, the crossbar is placed at the free ends of the branches, between which it extends. The branches are more particularly oriented parallel to the X orientation about which the corresponding movement is roll. They are spaced apart from each other along the Y orientation about which the corresponding movement is pitching.

By way of example, in an application of the mechanism to a seat, the branches are oriented parallel via the longitudinal X orientation of the seat, being spaced apart from each other in the transverse Y orientation of the seat. Each of the branches is hinged to the bearings at its anchor end about respective pivot axes that are spaced apart and parallel. The pivot axes extend in particular parallel to the Y orientation and are spaced apart from each other along the X orientation. The branches together carry the torsion shaft at their free ends, which shaft is suitable to act as weighting for the lever arm and constitutes mainly the deformable means.

Preferably, in order to reinforce the weighting of the fork and in order to filter both pumping and pitching vibration, the torsion shaft (or arm) carries a first weight located between its two ends, and more particularly in its middle zone, and a second weight that is subdivided in two individual weights that are interposed between the ends of the torsion shaft (e.g.

in the shape of a bar) and the corresponding free ends of the branches. The force from the first structure is amplified by the weighted fork.

This amplified force of tuned frequency is at the same amplitude and in phase opposition relative to the force delivered by the torsion shaft against deformation thereof.

Each torsion shaft contributes to the deformable means of the mechanism and at least in part to the weight weighting the lever arm.

The structure of the mechanism, mainly constituted by the fork carrying the torsion shaft at its free end, is easily integrated in the equipment to be protected from vibration. The mechanism is compact and suitable for remaining within the footprint of the equipment. The pivot axes of the lever arm are parallel. Further, the lever arm is arranged as a fork with the torsion shaft extending between its branches, so the means for interposing the filter member between the two structures are easily incorporated in the equipment. Such interposition means may be made up of mainly of a fastener member for fastening to the first structure, formed merely by a frame firmly attached to the fuselage of the aircraft, e.g. a floor, and by a fastener member incorporated in the structure of the equipment, such as the uprights of a seat that together carry a seat bucket.

The junction between the fastener members takes place directly via the fork, thereby enabling the structure of the mechanism to be simplified and enabling equipment incorporating the mechanism to be installed independently on any first structure attached to the fuselage of the aircraft. The assembly formed by the interposition means and the fork may be housed under the equipment without excessively increasing its overall size.

When incorporated in the equipment, the mechanism does not impede freedom to move about inside the aircraft. The mechanism is made up of a limited number of members, thereby making it easier to produce, easier to install, and easier to integrate in the equipment, in particular a seat. The weighting of the fork is easily obtained by means of the torsion shaft which may easily incorporate additional weights along its length.

Specifically, each first weight is associated with filtering vibration in pitching. The fork constitutes a generally flat one-piece member that extends in the XY sliding plane, and it presents flexibility in movement in its general plane that can easily be obtained for filtering sliding vibration. Using a structure that is simple and easy to obtain, the mechanism is suitable for filtering vibration simultaneously in pumping, in pitching, and in sliding, and possibly also in roll by replicating the fork along the Y orientation.

Preferably, the torsion shaft carries a first weight between its ends that are respectively engaged on each of the branches. The first weight is located in particular in the middle zone of the torsion shaft, being more particularly placed in a zone that corresponds substantially to being vertically in register with the center of gravity of the equipment. This first weight serves to filter pitching vibration and it extends radially relative to the axis along which the torsion shaft extends, and more particularly relative to its general diameter along its length that is used for providing the deformable means.

Each torsion shaft also carries a second weight for filtering pumping vibration. Each second weight is in particular subdivided into two individual weights, which are interposed respectively between each end of the torsion shaft and the corresponding free ends of the branches.

More particularly, the overall weighting weight of each fork is made up of the torsion shaft or arm secured to the free ends of the branches, of the first weight carried in the middle zone of the torsion shaft, and of the second individual weight interposed between the ends of the torsion shaft and the respective free ends of the branches. These arrangements are such that a single assembly suitable for constituting a unitary part combines the first weight used for filtering pitching vibration, together with the second weight used for filtering pumping vibration.

Each torsion arm together with its first weight and second weight constitutes a one-piece assembly that is suitable for being obtained easily by molding or forging a metallic material, in particular steel or titanium. It is also possible to form the torsion shaft from a metal material suitable for providing the deformation desired for the torsion shaft, and to add the weights to the torsion shaft, e.g. by bonding them thereto by adhesive, welding, or some other analogous technique. In this variant, the weights may be formed from a material that is different from that from which the torsion shaft is mainly formed.

In an embodiment, the interposition means forming part of the filter member comprise a pair or couple of fastener members for fastening respectively to the first structure and to the second structure. The fork is housed in between and is hinged to the pairs of fastener members which are located in particular at the sides of the piece of equipment to be protected from vibration and spaced apart from each other. More particularly, the fastener members are elongate members extending in the X orientation, and they are spaced apart from each other in the Y orientation.

For example, each pair of fastener members comprises a foot for fastening the filter member to the first structure and a soleplate for incorporating the fastener member in a frame of the equipment that is to be protected from vibration. The extent of the feet and of the soleplates corresponds to the extent of the branches of the fork, so as to impart stability to the assembly of the mechanism on the equipment.

The hinge bearing between the lever arm and the first structure is located at its anchor end. The hinge bearing between the lever arm and the second structure is located at its opposite end. These dispositions enable the mechanism to be made more compact, each foot including an open housing for receiving the corresponding soleplate. The height extent of the mechanism along the Z orientation is thereby reduced with the advantage of making it easier to incorporate in the equipment to be protected from vibration without excessively increasing its overall size. The underpart of the equipment presents dimensions in projection on the XY plane that are suitable for accommodating the mechanism, and the height size along the Z orientation of the underpart corresponds substantially to the height of the feet that house the soleplate.

Each of the branches is arranged with tips that are placed astride a corresponding foot. The soleplates include respective windows therein for passing the crossbar and the shaft or arm therethrough. These windows are open towards the feet housing the corresponding soleplate so as to facilitate hinged assembly of the fork with the feet and with the soleplate. The distance between the branches themselves is optimized with the advantage of enabling corresponding optimization of the length in which the torsion shaft extends along the Y orientation.

The branches of the fork are hinged via a flexible mass to at least one of the corresponding pairs of bearings hinging the fork to the feet and/or to the soleplate. The branches are hinged via the flexible mass to the bearings associated with the first structure and in particular to the bearings carried by the feet. Tolerance in tilting is allowed between the two structures by virtue of the fork that is flexibility mounted to the bearings pivoting. This movement tolerance corresponds to a hard floating mount of the fork relative to at least one of the structures, and on the feet relative to the first structure. Such a hard floating mount imparts an ability to the mechanism to filter vibration in sliding, by allowing corresponding relative movement of the structures between one another without harming the robustness of the hinges of the branches that are held together by the crossbar, and consequently without harming the filtering of vibration in pumping and/or in pitching.

In an embodiment, the mechanism comprises a pair of similar filter members that are interposed between the first structure and the second structure by being placed head to head. The relative orientation and association between the two filter members serves to optimize the reliability of the vibration filtering obtained, in particular in pitching and in sliding.

The first weights respectively included in the torsion shafts of each of the filter members of the pairs are placed close to each other, being disposed substantially in register with the center of gravity of the equipment to be protected from vibration. These arrangements encourage balancing of the mechanism and enhance filtering of vibration in pitching. The close-together first weights are secured to each other by a junction member. By way of example, the junction member is constituted by plates or analogous junction members between the first weight. These plates engage each of the first weights associated respectively with the torsion shafts of each of the filter members of the pair.

The interposition means with which the associated filter members that are disposed head to head are provided, are common thereto. In particular, the filter means are mounted to be pivotally hinged to the same feet and soleplates.

A piece of equipment provided with a mechanism as described above is recognizable in that it structurally incorporates the mechanism including the interposition means with which it forms a unitary assembly. It can be understood that such integration is to be taken into consideration with regard to the fact that the equipment may itself be installed on board or separated from the aircraft, while still being fitted with the mechanism of the invention with which it forms a the unitary assembly. The unitary assembly comprising the piece of equipment and the mechanism is suitable for being fastened on the first structure in a single mounting operation.

The mechanism is placed at the base of the unitary assembly. The term "base" is used to mean the base of the unitary assembly whereby it is fastened to the first structure. More particularly, the mechanism is housed in an underpart of the equipment defined between the pairs of fastener members for fastening respectively to the first structure and to the second structure.

In an example application of the mechanism, the equipment is a seat comprising a frame mainly constituted by lateral uprights carrying a bucket. Each upright incorporates a soleplate and together therewith they constitute a one-piece rigid assembly. The soleplates are connected to respective feet for fastening the seat to a floor via at least one the fork hinged jointly to pivot relative to the soleplates and to the feet.

More particularly, a seat constituting a piece of equipment of the present invention is of the kind that includes a frame made up of lateral uprights that jointly carry a bucket. The bucket is carried by the uprights via a mechanism for releasing the bucket in the event of a crash of the aircraft in which the seat is installed. Such a mechanism is organized in particular to release the bucket as from a threshold stress to which the bucket is subjected and to retain it via means that deform as a result of such release. Each upright is engaged on a foot for fastening the seat to the first structure of the aircraft, in particular the floor. Each foot is provided with means for fastening to the first structure, in particular via complementary fastener members that co-operate and that are associated respectively with the foot and with the first structure. Such complementary fastener members are arranged as sliding members such as a slideway and a rail, or analogous co-operating members, so that the position of the seat on the first structure is adjustable along the X orientation.

A seat of the present invention is recognizable in that it incorporates a mechanism for filtering vibration from the first structure, as described above, which mechanism is housed in an underpart of the seat.

More particularly, the feet are connected to the corresponding uprights via the soleplates and fork at least as described above. The fork is hinged to pivot on bearing associated respectively with the soleplates and with the feet via the branches of the fork. The fork is arranged as a weighted lever arm, being constituted mainly by a pair of the branches that are joined together by a crossbar disposed at their free ends opposite from their anchor ends whereby the fork is hinged to the soleplates and to the feet about spaced-apart parallel axes. At its free end, the fork carries the torsion shaft which is provided with first and second weights. The feet include respective housings that are open for receiving the soleplate and the soleplate includes respective open windows for passing the crossbar and the torsion shaft therethrough.

The pivoting stroke of the fork is limited between two abutment positions corresponding with the stress threshold at which the bucket release mechanism comes into operation. These arrangements are such that the vibration filter mechanism incorporated in the seat does not constitute an obstacle to implementing the mechanism dedicated to protecting passengers in the event of a crash.

The pivoting stroke of the fork is limited between the inside face of the open housing included in the feet and the facing inside face of the open window included in the soleplates, against which faces the fork comes into abutment, in particular via its crossbar. Such an arrangement of the abutment means limiting the stroke of the fork is easily incorporated in the mechanism of the invention by the association made between the preferred structure specific to the fork that includes in particular branches arranged with tips astride the feet, and the formation of the housings and windows included respectively in the feet and the soleplates.

BRIEF DESCRIPTION OF THE DRAWINGS

Embodiments of the present invention are described with reference to the figures of the accompanying sheet, in which.

DETAILED DESCRIPTION OF THE PREFERRED EMBODIMENT

In order to illustrate the ways in which the mechanisms shown in the various figures are organized and how they operate, reference is made to orientations that are longitudinal (X), transverse (Y), and height-wise (Z), and also to movements, in particular pumping movements along the Z direction, pitching movements about the Y direction, and sliding movements in the XY plane, as defined above.

Figure 1:
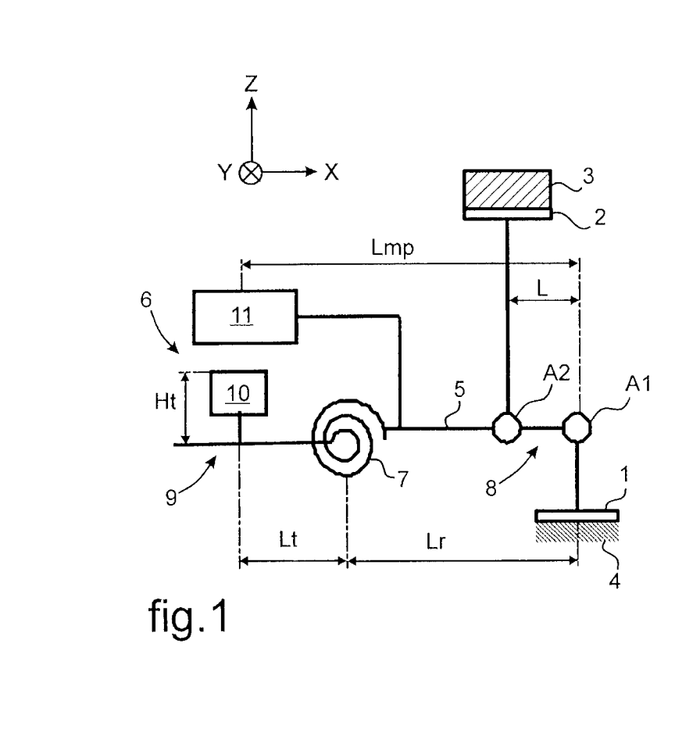
FIGS. 1 and 2 are diagrams showing respective implementations of a mechanism of the present invention.
Figure 2:
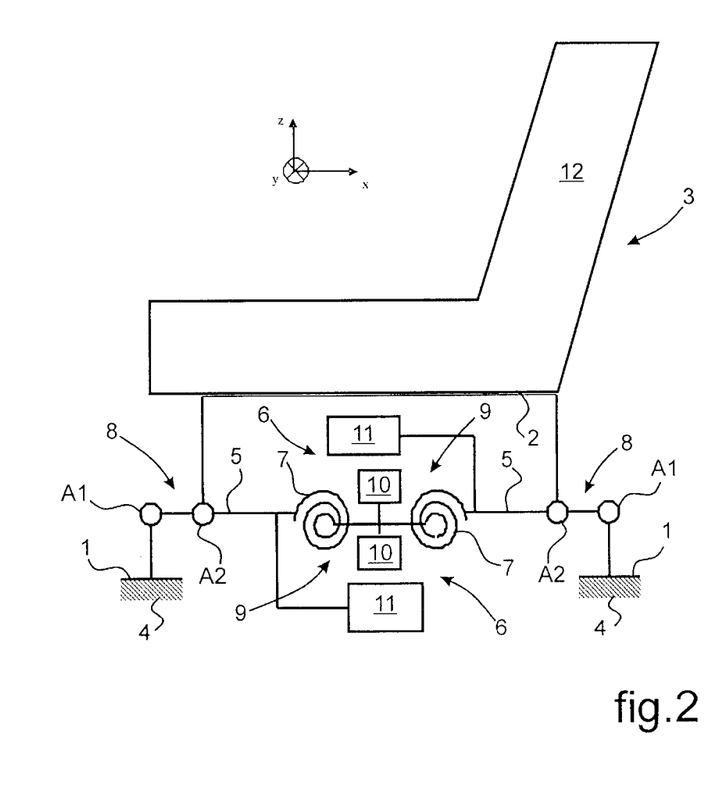

In FIGS. 1 and 2, a mechanism for filtering the vibration induced by an aircraft as it advances is arranged in the zone of a piece of equipment that is to be protected from the vibration. Such vibration is at high frequency and of low amplitude, compared with the movements caused by the aircraft traveling in flight.

The mechanism is interposed between a first structure 1 designed to be securely supported by the fuselage 4 of the aircraft, in particular its floor, and a second structure 2 that is secured to the equipment 3. The mechanism implements one or more lever arms 5. Each is weighted by an overall weight 6 and hinged to both of the structures 1 and 2.

The lever arm(s) 5 is/are engaged with deformable means 7 allocated thereto. The deformable means 7 are suitable for opposing pivoting of the lever arm(s) 5 about its/their respective hinge axes A1, A2 with the structures 1, 2. The relative movements between the structures 1 and 2 that are induced by vibration coming from the first structure 1 are filtered by the deformable means 7 so as to protect the equipment from the vibration. The forces transmitted by the first structure are amplified by the weighted lever arm(s) 5 and are absorbed by the elastic resistance opposed by the deformable means 7.

The hinge axes A1, A2 of the or each lever arm 5 on the structures 1 and 2 are arranged an the anchor end 8 thereof, the hinge axes being spaced apart from each other and being oriented parallel with the Y orientation. The (or each) lever arm 5 is hinged to the first structure 1 at the tip of its lever end 8, and to the second structure 2 at a point between the two ends of the lever arm 5. The overall weight 6 and the deformable means 7 associated with each lever arm 5 are located at the free opposite end 9 of the corresponding lever arm 5. The weight 6 for the (or each) lever arm 5 is subdivided into two associated weights. A first weight 10 is engaged directly on the deformable means 7 and is used for filtering pitching vibration about the Y orientation. A second mass 11 is engaged directly with the free end 9 of the corresponding lever arm 5 and is used for filtering pumping vibration along the Z orientation.

More particularly, with reference to FIG. 1, the following characteristics of the mechanism shown of the present invention are defined:

Mt corresponds to the mass of the weight 10 for filtering pitching vibration;

Mp corresponds to the mass of the weight 11 corresponding to filtering pumping vibration;

L is the distance along the X orientation between the hinge axis A1 of the lever arm 5 of the first structure 1 and the hinge axis A2 of the lever arm 5 on the second structure 2;

Lr is the separation distance along the X orientation between the deformable means 7 and the first structure 1;

Lt is the separation distance along the X orientation between the deformable means 7 and the weight 10 for filtering pitching vibration;

Lmp is the separation distance along the X orientation between the first structure 1 and the weight 11 for filtering pumping vibration;

Ht is the separation distance along the Z orientation between the weight 10 for filtering pitching vibration and the deformable means 7;

Meqp is the equivalent mass of Mp that results from implementing the mechanism for filtering pumping vibration;

$\Omega_p$ is the tuned pumping frequency between the mass Meqp and the resistance opposed by the deformable means 7;

Meqt is the equivalent mass of Mp resulting from implementing the mechanism for filtering pitching vibration; and $\Omega_t$ is the tuned pitching frequency between the mass Meqt and the resistance opposed by the deformable means 7.

On the basis of these characteristics, the corresponding values and the structural arrangement of the mechanism of the invention are defined using the following relationships:

$$Meqp = \left(\frac{Lmp}{L}\right)^2 Mp + \left(\frac{Lr}{L}\right)^2 Mt$$

$$\omega_p = \sqrt{\frac{\left(\frac{K_\theta}{L^2}\right)}{Meqp}}$$

$$Meqt = \left(\frac{Lmp}{L}\right)^2 Mp + \left(\frac{Lr}{L}\right)^2 \left(\frac{Ht}{Lt}\right)^2 Mt$$

$$\omega_t = \sqrt{\frac{\left(\frac{K_\theta}{L^2}\right)}{Meqt}}$$

The tuning adjustments in pumping and pitching between the deformable means 7 and the equivalent masses Meqp and Meqt are easily achieved depending on how the mechanism is adapted to a specific piece of equipment and/or depending on the vibration to be filtered. To adjust the tuning in pumping, the masses Mt and Mp are adjusted. To adjust the tuning in pitching, the distance Ht is adjusted. Such adjustments can be made without significant structural modification and/or without making the mechanism bulky.

The lever arm 5 amplifies the movement of the overall weight 6 with the effect of generating a force that, at the tuned frequency, is of the same amplitude and in phase opposition to the resistance opposed by the deformable means 7. This tuned frequency is independent of the weight and/or the dynamic reactions specific to the piece of equipment 3. The mechanism is suitable for being used to protect from vibration a piece of equipment 3 of weight that likely to vary, such as a seat that is likely to be used by passengers having respective different weights. The fittings of the equipment 3 suitable for compensating the general movements of the aircraft, such as the suspension means of a seat, may provide high resistance against such general movements, with the filter mechanism remaining effective and reliable in spite of this high resistance of the fittings.

In FIG. 2, the mechanism shown diagrammatically in FIG. 1 is applied to a piece of equipment constituted by a seat 12. In the preferred embodiment shown, the mechanism has two similar lever arms 5 that are disposed head to head in the general plane in which they are interposed between the first structure 1 and the second structure 2 that are secured respectively to the fuselage and to the seat 12. Under the effect of vibration generated along the pumping axis Z, the set of weights 10, 11 carried by each of the lever arms 5 oscillates vertically in phase with the vibration. Under the effect of the vibration generated about the pitching axis Y and/or in sliding in the XY plane, the weights 11 carried by each of the lever arms 5 and associated with filtering pumping vibration are in phase opposition relative to the deformable means 7, and the weights 10 for filtering pitching vibration oscillate about the Y axis.

Figure 3:
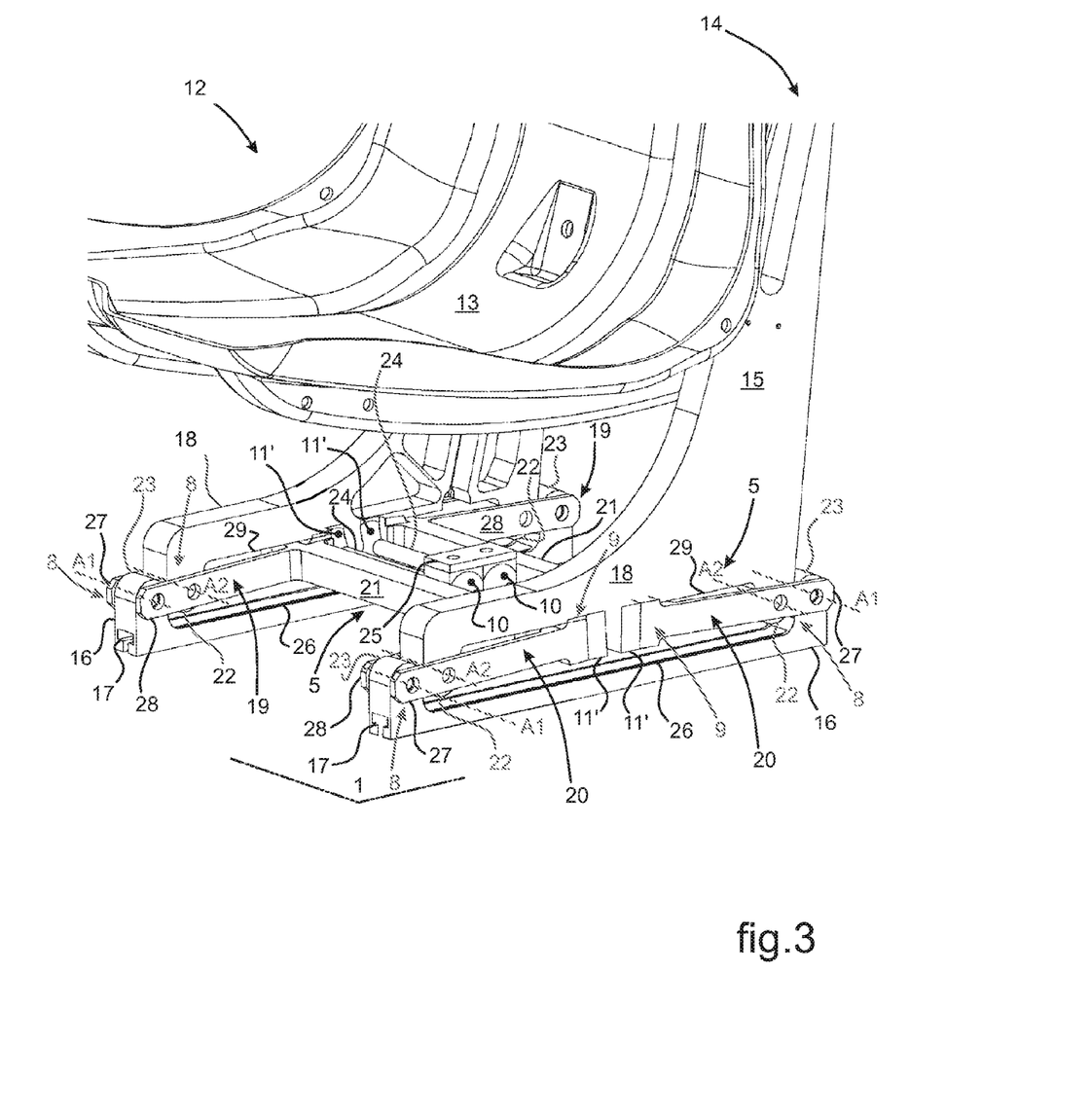
FIGS. 3 and 4 are fragmentary perspective views respectively from in front and from beneath showing a seat incorporating a mechanism in a preferred embodiment of the invention.
Figure 4:
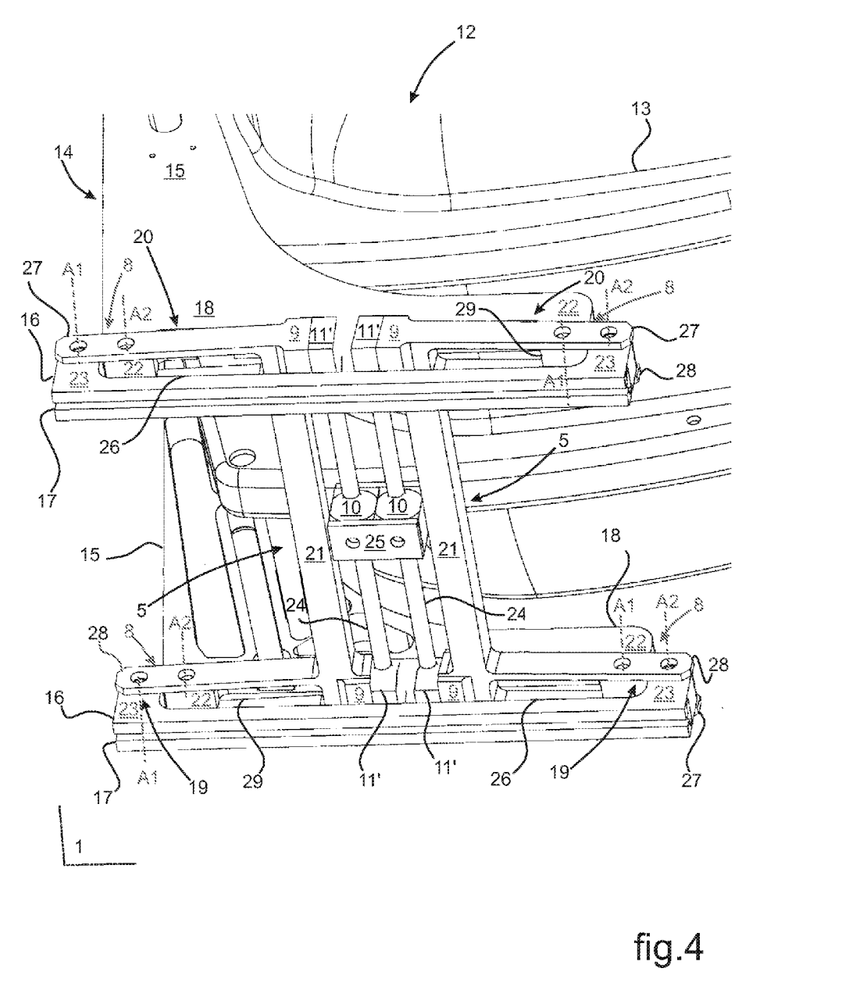

In FIGS. 3 and 4, a seat 12 is fitted with a mechanism for filtering vibration coming from the first structure 1 of the embodiment shown diagrammatically in FIG. 2. Specifically, the first structure 1 is constituted by the floor of the aircraft, which floor may be securely fastened to the fuselage of the aircraft. The seat 12 mainly comprises a bucket 13 carried on a frame 14 having two uprights 15 assembled to respective feet 16 for fastening the seat 12 to the floor. For this purpose, each foot 16 has fastener members 17 for fastening the seat 12 to the floor in a desired longitudinal position. In the example shown, these fastener members 17 are arranged as sliding members, in particular fastening slides that are suitable for sliding co-operation with rails incorporated in the floor of the aircraft.

The seat 12 structurally incorporates the mechanism so that the seat 12 and the mechanism it incorporates constitute a unitary removable assembly suitable for being mounted on and/or dismounted from the floor via its feet 16. The filter mechanism is structurally compact, thereby making it suitable for being housed overall in the bottom portion of the seat 12 defined between the feet 16. The frame 14 of the seat 12 is fastened to the feet 16 via a pair of lever arms 5 shaped as forks and disposed head to head in their general plane corresponding substantially to the sliding plane.

Each of these lever arms 5 is hinged about its pivot axes A1 and A2 respectively to the feet 16 and to corresponding soleplates 18 that are provided at the base of each of the uprights 15 of the frame 14. The seat 16 and the soleplates 18 constitute means for interposing the mechanism between the floor constituting the first structure 1 and the seat 12 constituting the second structure 2, being arranged as members for securing the mechanism respectively to the first structure 1 and to the second structure 2. The second structure 2 includes the soleplate 18. The mechanism is secured to the first structure 1 by the firm attachment via the fastener members 17, and to the second structure 2 by the soleplates 18 being incorporated in the uprights 15.

Each of the forks forming the lever arms 5 comprises a single unit made up of a pair (i.e. a couple) of branches 19, 20 connected together by a crossbar 21. The branches 19, 20 are spaced apart from each other transversely relative to the seat 12, and each of them is hinged at its anchor end 8 to the soleplate 18 incorporated in the corresponding upright 15 and to a corresponding foot 16 for fastening the seat 12 to the floor. The branches 19, 20 of the forks are each hinged to the corresponding feet 16 and soleplates 18 via bearings 22, 23 that incorporate flexible masses. Such flexible masses are deformable both in rotation and in the length direction of the hinge axes of the branches 19, 20 to the soleplates 18 and the feet 16, such that they contribute filtering lateral vibration components by a decoupling effect, and they allow vibration in sliding to be filtered in spite of the pivoting hinge connection of the forks to the feet and the soleplates.

The branches 19, 20 of each fork are securely connected together by the corresponding crossbar 21 which is located at the free ends 9 thereof opposite from their anchor ends 8. The crossbar 21 imparts stiffness to the forks in their general plane, thus making it possible to avoid undesirable pivoting of the branches 19, 20 about the longitudinal direction of the seat 12, and imparting stiffness in twisting to the forks in the transverse direction of the seat 12. The deformable means of the mechanism are formed by torsion shafts 24 (e.g. in the form or a bar or arm) that are carried respectively by each of the forks. The torsion shafts extend between the branches 19, 20 of each the forks, extending parallel to the corresponding crossbar 21.

Each torsion shaft 24 carries a first weight 10 for filtering twisting vibration. The first weights 10 are placed between the ends of the torsion shafts 24, and more particularly in their middle longitudinal zones.

The positioning of the first weights 10 in the longitudinally middle zones of the torsion shafts 24 corresponds substantially to the longitudinally middle axis of the seat 12. Since the seat 12 is generally symmetrical about the middle axis, using a pair of forks placed head to head, enables the first weight 10 carried respectively thereby to be located substantially in register with the center of gravity of the seat 12. The first weights 10 of the torsion shafts 24 are connected together by a junction member 25, such as a set of plates in the embodiment shown. Each fork carries the torsion shaft 24 that is associated therewith via a pair of second individual weights 11' that are interposed respectively between the ends of the torsion shaft 24 and the free ends 9 of the branches 19, 20 of the corresponding fork.

Each of the torsion shafts 24 and of the weights 10, 11' carried thereby constitutes a one-piece unit, that is easily made by casting or by forging, and that is easily mounted on the seat 12. The torsion shafts 24 are fitted to the mechanism by being mounted suspended from the free ends 9 of the forks, with the weight of the one-piece unit 24, 10, 11' being used to reduce the overall useful weight of the mechanism.

Each foot 16 includes a housing 26 for receiving the soleplate 18 formed at the base of the corresponding upright 15 together with the hinge bearings 22 with which they are provided. The branches 19, 20 of the forks have their tips 28, 27 placed astride the corresponding soleplates 18 and feet 16.

Each soleplate 18 has an open window 29 for passing the crossbars 21 and the torsion arms 24 therethrough. The pivoting movement of the forks is limited between two abutment positions, such that the mechanism does not constitute an obstacle to fitting a mechanism dedicated to protecting passengers in the event of a crash.

Such a protection mechanism is commonly a mechanism for releasing the bucket 13 above some predetermined threshold of stress applied to the seat 12 and/or specifically to the feet 16 fastening the seat 12 to the floor of the aircraft. The forks are free to move in the space defined between the facing faces respectively of housings 26 included in the feet 16 and the windows 29 included in the soleplates 18. These facing faces constitute abutment members against which the forks come to bear at the respective extreme positions of their stroke, in particular via the crossbars 21 they incorporate.

What is claimed is:

1. A vibration filter mechanism for aircraft equipment, the mechanism comprising:
   a pair of filter members for connecting between a first structure connected to a fuselage of an aircraft and a second structure connected to the equipment, each of the pair of filter members including:
      a lever arm weighted at a free end and hinged at an opposite, anchor end to hinges respectively associated with each of the first and second structures, the lever arm cooperating with a deformable torsion shaft for opposing pivoting movements of the lever arm on the hinges, the lever arm arranged as a one-piece fork having a pair of branches interconnected by a crossbar and individually hinged to the hinges about spaced-apart parallel pivot axes, wherein the torsion shaft extends between the pair of branches at the free end, the torsion shaft defining ends and carrying a first weight placed in a middle zone between the ends of the torsion shaft to filter pitching vibration;
   wherein the pair of filter members are placed in a head-to-head orientation such that each of the crossbars are adjacent each other;
   the first weight of each torsion shaft being secured to each other by a junction member;
   wherein the pivoting movement of the lever arms are limited by the crossbars.

2. The mechanism according to claim 1, wherein each torsion shaft carries a second weight to filter pumping vibration, the second weight being subdivided into two individual weights, each of which is interposed respectively between the ends of the torsion shaft and the ends of the branches at the free end of the lever arm.

3. The mechanism according to claim 1, wherein each lever arm possesses an overall weight that is made up of the torsion shaft, the first weight, and two individual weights.

4. The mechanism according to claim 1, wherein each of the pair of filter members includes a pair of fastener members for fastening respectively to the first structure and to the second structure, each lever arm being received between the pair of fastener members and being hinged to the fastener members; each pair of fastener members comprising a foot for fastening to the first structure and a soleplate for securing to a frame of the equipment.

5. The mechanism according to claim 4, wherein each foot includes an opening for receiving the corresponding soleplate.

6. The mechanism according to claim 1, wherein the hinge of each lever arm associated with the first structure is positioned at the anchor end of the lever arm, and wherein the hinge of each lever arm associated with the second structure is positioned between the anchor end and the free end of the lever arm.

7. The mechanism according to claim 1, wherein the equipment includes a seat including uprights carrying a bucket, each upright incorporating a soleplate forming part of the filter members, each soleplate being connected to respective feet also forming parts of the filter members; each foot serving respectively to fasten the seat to a floor via the lever arms.

8. The mechanism according to claim 7, wherein the pivoting movement of each lever arm is limited between two abutment positions.

9. The mechanism according to claim 8, wherein the two abutment positions of each lever arm are defined between a first position where the lever arm is limited between an inside face of an opening included in the feet and a second position where the one-piece fork is limited by a facing inside face of an open window included in the soleplates.

10. The mechanism according to claim 1, wherein each torsion shaft carries a second weight to filter pumping vibration.

11. The mechanism according to claim 10, wherein the overall weight of each lever arm is defined by the torsion shaft, the first weight, and the second weight.

12. A vibration filter mechanism for aircraft equipment connecting between a fuselage of an aircraft and the aircraft equipment, the mechanism comprising:
  a first lever arm defined by a first deformable torsion shaft extending between a pair of branches, wherein the first lever arm is hinged at an anchor end and includes a first weight at an end opposite the anchor end; and
  a second lever arm defined by a second deformable torsion shaft extending between a pair of branches, wherein the second lever arm is hinged at an anchor end and includes a second weight at an end opposite the anchor end,
  wherein the first and second lever arms are oriented in a mirror-relationship such that the first torsion shaft is adjacent the second torsion shaft,
  wherein the first and second lever arms each include two spaced-apart parallel pivot axes associated with each of the fuselage and the aircraft equipment respectively,
  wherein the first and second lever arms cooperate to oppose pivoting movements of the lever arms to filter pitching vibration from the fuselage to the aircraft equipment,
  wherein the first and second weights are secured to a middle-zone of each of the first and second torsion shafts respectively, and
  wherein the first and second weights are secured to each other.

13. The mechanism according to claim 12, wherein each of the first and second lever arms includes a cross-member extending between the pair of branches, wherein rotational movement of the first and second lever arms is limited by the cross-members.

14. A vibration filter mechanism for aircraft equipment connecting between a fuselage of the aircraft and the aircraft equipment, the mechanism comprising:
  a first lever arm defined by a first deformable torsion shaft extending between a pair of branches, wherein the first lever arm is hinged at an anchor end and includes a first weight at an end opposite the anchor end; and
  a second lever arm defined by a second deformable torsion shaft extending between a pair of branches, wherein the second lever arm is hinged at an anchor end and includes a second weight at an end opposite the anchor end,
  wherein the first and second lever arms are oriented in a mirror-relationship such that the first torsion shaft is adjacent the second torsion shaft,
  wherein the first and second lever arms each include two spaced-apart parallel pivot axes associated with each of the fuselage and the aircraft equipment respectively,
  wherein the first and second lever arms cooperate to oppose pivoting movements of the lever arms to filter pitching vibration from the fuselage to the aircraft equipment,
  wherein the first lever arm includes a first additional weight; and the second lever arm includes a second additional weight, wherein the first and second additional weights cooperate to filter pumping vibration.

15. The mechanism according to claim 14, wherein the first additional weight includes two individual weights located at opposing ends of the torsion shaft of the first lever arm and interposed respectively between the torsion shaft of the first lever arm and one of the pair of branches of the first lever arm, and wherein the second additional weight includes two individual weights located at opposing ends of the torsion shaft of the second lever arm and interposed respectively between the torsion shaft of the second lever arm and one of the pair of branches of the second lever arm.

* * * * *